United States Patent
Shichino

(10) Patent No.: US 9,941,750 B2
(45) Date of Patent: Apr. 10, 2018

(54) POWER TRANSMITTING APPARATUS, CONTROL METHOD FOR POWER TRANSMITTING APPARATUS, AND RECORDING MEDIUM STORING PROGRAM

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 331 days.

(21) Appl. No.: 14/787,200

(22) PCT Filed: Jun. 18, 2014

(86) PCT No.: PCT/JP2014/003269
§ 371 (c)(1),
(2) Date: Oct. 26, 2015

(87) PCT Pub. No.: WO2014/208055
PCT Pub. Date: Dec. 31, 2014

(65) Prior Publication Data
US 2016/0119884 A1    Apr. 28, 2016

(30) Foreign Application Priority Data

Jun. 26, 2013  (JP) ................. 2013-133523

(51) Int. Cl.
*H01F 27/42* (2006.01)
*H01F 37/00* (2006.01)
(Continued)

(52) U.S. Cl.
CPC ............. *H02J 50/40* (2016.02); *H02J 1/14* (2013.01); *H02J 5/005* (2013.01); *H02J 7/025* (2013.01);
(Continued)

(58) Field of Classification Search
CPC .. H02J 50/40; H02J 50/80; H02J 50/60; H02J 1/14; H02J 5/005; H02J 7/025;
(Continued)

(56) References Cited

U.S. PATENT DOCUMENTS 8,198,858 B2    6/2012  Kim et al.
8,830,036 B2    9/2014  Park et al.
(Continued)

FOREIGN PATENT DOCUMENTS

CN    101459981 A    6/2009
CN    101645618 A    2/2010
(Continued)

OTHER PUBLICATIONS

Office Action dated Jun. 2, 2017, in Chinese Patent Application No. 201480035903.1.
(Continued)

*Primary Examiner* — Carlos Amaya
(74) *Attorney, Agent, or Firm* — Fitzpatrick, Cella, Harper & Scinto

(57) ABSTRACT

The present invention relates to improvement of usability in the case of detecting a second power receiving apparatus during transmission of power to a first power receiving apparatus.
A power transmitting apparatus includes a power transmitting unit that transmits power to a plurality of power receiving apparatuses by radio, and a switching unit that controls, in a case where power is being transmitted to a first power receiving apparatus by the power transmitting unit, a power transmission mode for transmitting power to the first power receiving apparatus, and a detection mode for detecting a second power receiving apparatus that is different from the first power receiving apparatus. The resolution for detecting the second power receiving apparatus in the detec-
(Continued)

tion mode is higher than the resolution for detecting the second power receiving apparatus in the power transmission mode.

11 Claims, 12 Drawing Sheets

(51) Int. Cl.
| | | |
|---|---|---|
| *H01F 38/00* | (2006.01) | |
| *H02J 50/40* | (2016.01) | |
| *H02J 50/80* | (2016.01) | |
| *H02J 50/60* | (2016.01) | |
| *H02J 7/02* | (2016.01) | |
| *H02J 17/00* | (2006.01) | |
| *H02J 1/14* | (2006.01) | |
| *H02J 5/00* | (2016.01) | |
| *H04W 52/36* | (2009.01) | |
| *H04W 72/04* | (2009.01) | |
| *H02J 50/10* | (2016.01) | |

(52) U.S. Cl.
CPC .............. *H02J 17/00* (2013.01); *H02J 50/60* (2016.02); *H02J 50/80* (2016.02); *H04W 52/367* (2013.01); *H04W 72/0406* (2013.01); *H02J 50/10* (2016.02)

(58) Field of Classification Search
CPC ....... H02J 17/00; H02J 50/10; H04W 52/367; H04W 72/0406; H04B 5/0037; H01F 38/14
USPC .......................................................... 307/104
See application file for complete search history.

(56) References Cited

U.S. PATENT DOCUMENTS

| | | | |
|---|---|---|---|
| 9,178,360 B2 | 11/2015 | Tanabe | |
| 2010/0034238 A1 | 2/2010 | Bennett | |
| 2010/0181961 A1 | 7/2010 | Von Novak et al. | |
| 2011/0009057 A1 | 1/2011 | Saunamaki | |
| 2011/0254377 A1 | 10/2011 | Wildmer et al. | |
| 2012/0062173 A1* | 3/2012 | Choi | ...................... H02J 5/005 320/108 |
| 2012/0293007 A1 | 11/2012 | Byun et al. | |
| 2013/0300355 A1 | 11/2013 | Jung | |

FOREIGN PATENT DOCUMENTS

| | | |
|---|---|---|
| CN | 102244399 A | 11/2011 |
| CN | 102684317 A | 9/2012 |
| EP | 2066001 A2 | 6/2009 |
| JP | 2006-230129 | 8/2006 |
| JP | 2009-136133 A | 6/2009 |
| JP | 2011-010384 A | 1/2011 |
| JP | 2012-005238 A | 1/2012 |
| JP | 2012-516131 | 7/2012 |
| JP | 2012-175824 A | 9/2012 |
| JP | 2014-515254 | 6/2014 |

OTHER PUBLICATIONS

Office Action dated Mar. 14, 2017, in Japanese Patent Application No. 2013-133523.

\* cited by examiner

FIG. 10

| ADDRESS (1000) | SET FLAG (1001) |
|---|---|
| Rx1 | 1 |
| Rx2 | 0 |

FIG. 11A

| I_before (1100) | I_now (1101) | CHANGE AMOUNT (1102) | DETECTION REGISTER (1103) |
|---|---|---|---|
| 5 | 10 | 5 | 01 |

FIG. 11B

| I_before (1100) | I_now (1101) | CHANGE AMOUNT (1102) | DETECTION REGISTER (1103) |
|---|---|---|---|
| 5 | 5 | 0 | 11 |

FIG. 11C

| I_before (1100) | I_now (1101) | CHANGE AMOUNT (1102) | DETECTION REGISTER (1103) |
|---|---|---|---|
| 5 | 8 | 3 | 10 |

FIG. 12

| | INITIAL ELECTRIC CURRENT | ALLOWANCE | FIRST NUMBER OF APPARATUSES | SECOND NUMBER OF APPARATUSES | THIRD NUMBER OF APPARATUSES | FIRST TRANSMISSION QUANTITY | SECOND TRANSMISSION QUANTITY | PROHIBITION FLAG |
|---|---|---|---|---|---|---|---|---|
| 1207 | 5 | 1 | 1 | 0 | 0 | 40 | 0 | 0 |
| 1208 | 5 | 1 | 1 | 1 | 1 | 40 | 0.05 | 0 |
| 1209 | 5 | 1 | 2 | 0 | 0 | 50 | 0.01 | 0 |

FIG. 13A

| | | | |
|---|---|---|---|
| 1300 | OUTPUT VOLTAGE | 10 | V |
| 1301 | OUTPUT POWER | 40 | W |
| 1302 | OUTPUT ELECTRIC CURRENT | 4 | A |
| 1303 | QUANTIZATION RESOLUTION | 6 | BITS |
| 1304 | POWER DETECTION PRECISION | 0.625 | W |
| 1305 | ELECTRIC CURRENT DETECTION PRECISION | 0.0625 | A |

FIG. 13B

| | | | |
|---|---|---|---|
| 1300 | OUTPUT VOLTAGE | 10 | V |
| 1301 | OUTPUT POWER | 0.05 | W |
| 1302 | OUTPUT ELECTRIC CURRENT | 0.005 | A |
| 1303 | QUANTIZATION RESOLUTION | 6 | BITS |
| 1304 | POWER DETECTION PRECISION | 0.78 | mW |
| 1305 | ELECTRIC CURRENT DETECTION PRECISION | 0.078 | mA |

FIG. 14

| | | | |
|---|---|---|---|
| 1400 | NUMBER OF POWER RECEIVING APPARATUSES | 5 | UNITS |
| 1401 | QUANTIZATION RESOLUTION | 6 | BITS |
| 1402 | POWER DETECTION PRECISION | 0.05 | W |
| 1403 | MAXIMUM INITIAL POWER | 0.25 | W |
| 1404 | ELECTRIC CURRENT DETECTION PRECISION | 0.005 | A |
| 1405 | POWER TRANSMISSION VOLTAGE | 10 | V |
| 1406 | SECOND TRANSMISSION QUANTITY | 3.2 | W |

POWER TRANSMITTING APPARATUS, CONTROL METHOD FOR POWER TRANSMITTING APPARATUS, AND RECORDING MEDIUM STORING PROGRAM

TECHNICAL FIELD

The present invention relates to a wireless power transmission system.

BACKGROUND ART

The technical development of wireless power transmission systems has been widely carried out recently. PTL 1 discloses a wireless power transmission system that includes a power transmitting apparatus having a power transmission mode in which power is transmitted to a power receiving apparatus and a detection mode in which, in the case where a voltage change is detected in the power transmission mode, whether the voltage change is caused by a foreign object or by a power receiving apparatus having moved is determined. PTL 1 describes that an influence on a foreign object is suppressed by making a voltage applied to a coil lower in the detection mode than in the power transmission mode. A technique has been developed in which one power transmitting apparatus performs wireless transmission of power to a plurality of power receiving apparatuses (PTL 2). PTL 2 discloses a configuration in which a power receiving apparatus is detected on the basis of an electric current that is generated when the power receiving apparatus exists in an electromagnetic field generated by a power transmission antenna.

CITATION LIST

Patent Literature

PTL 1: Japanese Patent Laid-Open No. 2006-230129
PTL 2: PCT Japanese Translation Patent Publication No. 2012-516131

SUMMARY OF INVENTION

Technical Problem

In the case where one power transmitting apparatus performs wireless transmission of power to a plurality of power receiving apparatuses as in PTL 2, the power transmitting apparatus needs to detect, while transmitting power to a first power receiving apparatus, a second power receiving apparatus and to start to transmit power also to the second power receiving apparatus. However, in order to detect an electric current generated by another power receiving apparatus, that is, the second power receiving apparatus, during transmission of a relatively high power to the first power receiving apparatus, an analog/digital (A/D) converter having a large quantization resolution is needed. For example, it is assumed that power is transmitted to the first power receiving apparatus at 40 W while power generated by the second power receiving apparatus coming in proximity to the power transmitting apparatus is 0.05 W. The power transmitting apparatus needs to detect a change of 0.05 W during power transmission at 40 W and therefore needs to have a circuit that is able to distinguish 1600 values obtained by dividing 40 by 0.05. Such a circuit is able to be implemented by using an A/D converter that has a quantization resolution of 11 bits (2048 values). In this case, the power resolution is approximately 0.02 W, which is obtained by dividing 40 W by 2048. However, in the case of transmitting power at 40 W, the noise level typically becomes high. Even in the case where an A/D converter that has a large quantization resolution is used, if the noise level is 0.02 W or higher, there is a possibility that the second power receiving apparatus is not able to be detected or erroneous detection may occur. Accordingly, a detection method used by the power transmitting apparatus in order to detect the second power receiving apparatus during transmission of power to the first power receiving apparatus has room for improvement.

Solution to Problem

In order to address the foregoing issue, the present invention provides a power transmitting apparatus including a power transmitting unit, a switching unit, and a detection unit. The power transmitting unit is configured to transmit power to a plurality of power receiving apparatuses by radio. The switching unit is configured to switch an operation mode of the power transmitting apparatus, in a case where power is being transmitted to a first power receiving apparatus, between a power transmission mode in which power is transmitted by the power transmitting unit to the first power receiving apparatus in response to a signal from the first power receiving apparatus, and a detection mode in which power transmission is performed by setting an output power of the power transmitting unit to a smaller value than an output power in the power transmission mode so as to detect a second power receiving apparatus that is different from the first power receiving apparatus. The detection unit is configured to detect a quantity of electricity generated by the second power receiving apparatus coming in proximity to the power transmitting apparatus during power transmission performed by the power transmitting unit in accordance with the output power of the power transmitting unit. A quantity of electricity detectable by the detection unit in the detection mode is smaller than a quantity of electricity detectable by the detection unit in the power transmission mode. The power transmitting apparatus detects the second power receiving apparatus on the basis of the quantity of electricity detected by the detection unit and transmits power to the second power receiving apparatus in response to a signal from the second power receiving apparatus.

Further features of the present invention will become apparent from the following description of exemplary embodiments (with reference to the attached drawings).

BRIEF DESCRIPTION OF DRAWINGS

FIG. 10 illustrates an example of information stored in a power receiving apparatus information storage unit.

FIG. 11A illustrates an example of information stored in a detection storage unit.

FIG. 11B illustrates an example of information stored in a detection storage unit.

FIG. 11C illustrates an example of information stored in a detection storage unit.

FIG. 12 illustrates an example of information stored in a system storage unit.

FIG. 13A is a diagram illustrating an operation state of a power transmission controller.

FIG. 13B is a diagram illustrating an operation state of a power transmission controller.

FIG. 14 is a diagram illustrating an operation state of a wireless power transmission system according to another embodiment.

DESCRIPTION OF EMBODIMENTS

First Embodiment

Figure 1A:
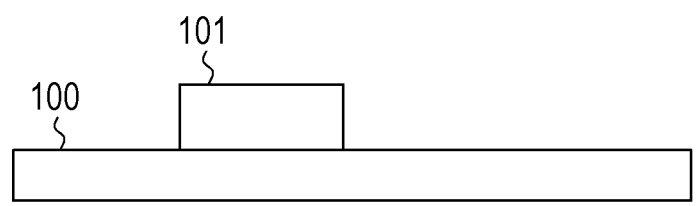
FIG. 1A is a diagram illustrating a configuration of a wireless power transmission system.
Figure 1B:
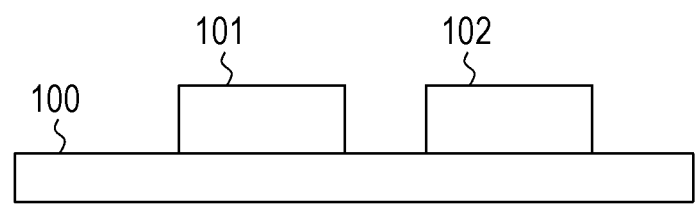
FIG. 1B is a diagram illustrating a configuration of a wireless power transmission system.

In this embodiment, a wireless power transmission system including a power transmitting apparatus that transmits power and a power receiving apparatus that receives power will be described. Examples of a wireless power transmission system of this embodiment are illustrated in FIGS. 1A and 1B, which include a power transmitting apparatus 100, a first power receiving apparatus 101, and a second power receiving apparatus 102. The power transmitting apparatus 100 is a wireless power transmission apparatus that performs power transmission by radio. The first power receiving apparatus 101 and the second power receiving apparatus 102 are wireless power transmission apparatuses that receive from the power transmitting apparatus 100 power used for charging batteries thereof or for operations performed thereby, by radio. FIG. 1A illustrates a state in which the power transmitting apparatus 100 transmits power to the first power receiving apparatus 101, and FIG. 1B illustrates a state in which the power transmitting apparatus 100 transmits power to the first power receiving apparatus 101 and the second power receiving apparatus 102.

Figure 2:
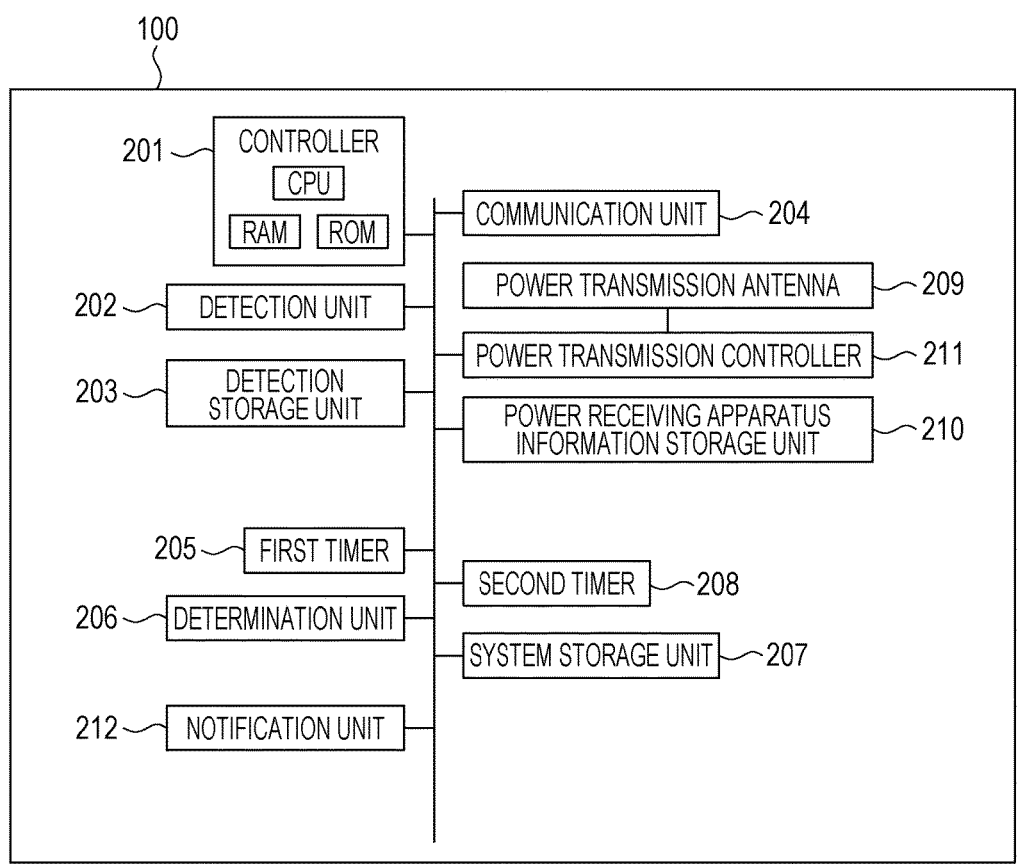
FIG. 2 is a block diagram illustrating a configuration of a power transmitting apparatus.

FIG. 2 is a block diagram illustrating a configuration of the power transmitting apparatus 100 of this embodiment. A controller 201 performs overall control of the power transmitting apparatus 100 by executing a control program stored therein. The controller 201 is constituted by a central processing unit (CPU), a read-only memory (ROM), and a random access memory (RAM). The overall control of the power transmitting apparatus 100 performed by the controller 201 is implemented by the CPU loading the control program retained in the ROM into the RAM and executing the control program. A detection unit 202 has a function of performing detection processing for detecting a power receiving apparatus that exists around the power transmitting apparatus 100, by determining the value of the electric current of a power transmission controller 211, which will be described below. The detection unit 202 is implemented by execution of the control program by the controller 201. The detection unit 202 performs detection processing for detecting a power receiving apparatus by detecting the quantity of electricity (electric current, voltage, power, or the like) generated by electromagnetic waves that have been transmitted and by a power receiving apparatus that exists around the power transmitting apparatus 100. A detection storage unit 203 stores the value of the electric current detected by the detection unit 202. The detection storage unit 203 may be constituted by the RAM described above or may be constituted by another storage device, such as a hard disk drive (HDD), for example.

A communication unit 204 is a chip that transmits and receives control signals used for performing power transmission control between the power transmitting apparatus 100 and a power receiving apparatus. In this embodiment, the communication unit 204 performs wireless communication compliant with Bluetooth (registered trademark) 4.0 standard (hereinafter referred to as BT 4.0). A first timer 205 and a second timer 208 are timers that measure time, which will be described in detail below. A determination unit 206 performs determination processing for determining a transmission quantity for a power receiving apparatus in accordance with the result of detection by the detection unit 202. The determination unit 206 is implemented by execution of the control program by the controller 201. A system storage unit 207 stores information regarding operations performed by the wireless power transmission system illustrated in FIGS. 1A and 1B. The system storage unit 207 may be constituted by the RAM described above or may be constituted by another storage device, such as an HDD, for example. A power transmission antenna 209 is coupled with a power receiving antenna of a power receiving apparatus to thereby perform power transmission. A power receiving apparatus information storage unit 210 stores address information and the like of a power receiving apparatus.

A power transmission controller 211 performs control relating to power transmission. The power transmission controller 211 is constituted by an application-specific integrated circuit (ASIC). The power transmission controller 211 controls transmission of power to another apparatus by using electromagnetic waves radiated from the power transmission antenna 209. The power transmission controller 211 is able to perform control for transmission of power to a plurality of power receiving apparatuses. The power transmission controller 211 controls the operation mode of the power transmitting apparatus 100, the operation mode including a power transmission mode for transmission of power to a power receiving apparatus and a detection mode for detecting another power receiving apparatus that is different from the power receiving apparatus to which power is being transmitted. The power transmission controller 211 switches the operation mode of the power transmitting apparatus 100 between the power transmission mode and the detection mode alternately. The power transmission controller 211 performs control such that an output power in the detection mode is smaller than an output power in the power transmission mode. A notification unit 212 makes various notifications to a user. The notification unit 212 has a functional unit, such as a liquid crystal display (LCD) or a light-emitting diode (LED), which enables output of visible information, or a functional unit, such as a speaker, which enables audio output.

Figure 3:
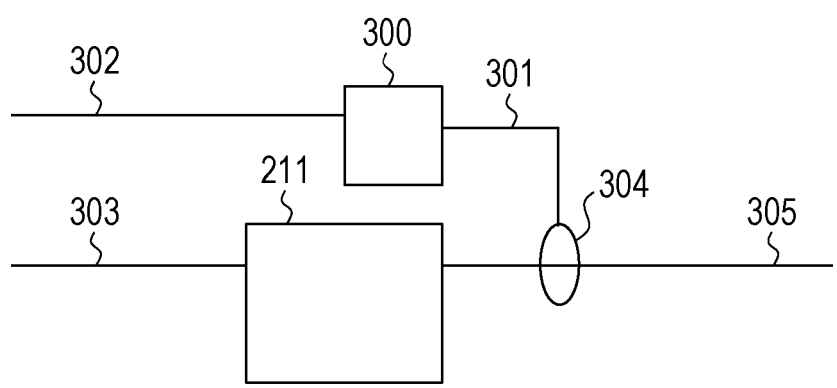
FIG. 3 is a diagram illustrating peripheral circuits connected to a power transmission controller.

Next, peripheral circuits connected to the power transmission controller 211 will be described with reference to FIG. 3. An input 301 of an A/D converter 300 converts the value of the electric current of an output 305 (connected to the power transmission antenna 209) of the power transmission controller 211 into a digital value via an electric current detection coil 304. An output 302 of the A/D converter 300 is connected to the CPU of the controller 201. The power transmission controller 211 converts a direct voltage applied to an input 303 into an alternating voltage (in this embodiment, the effective value of 10 V) having a constant amplitude, and supplies the alternating voltage to the power transmission antenna 209. It is sufficient that the electric current detection coil 304 has a function of determining the value of the electric current of the power transmission controller 211 and therefore the electric current detection coil 304 may be connected to the input 303. It is sufficient that the electric current detection coil 304 has a function of determining the value of the electric current of the power transmission controller 211 and therefore the electric current detection coil 304 may be constituted by connecting a constant resistor of approximately several tens of milliohms, which is widely used for electric current detection, to the output 305 or to the input 303 in series. The power transmission controller 211 controls the transmission quantity by controlling the amplitude of the alternating current to be outputted to the output 305. This control may be implemented by, for example, controlling the value of an electric current that flows in the base terminal of the transistor so as to control an electric current between the emitter terminal and the collector terminal.

Examples of the operation states of the power transmission controller 211 are illustrated in FIGS. 13A and 13B. An output voltage (1300) represents the effective value of the output voltage of the output 305 of the power transmission controller 211. An output power (1301) represents the effective value of the output power of the output 305. An output electric current (1302) represents the effective value of the output electric current of the output 305. A quantization resolution (1303) represents the quantization resolution of the A/D converter 300. A power detection precision (1304) represents the power detection precision of the A/D converter 300. The power detection precision is calculated on the basis of the quantization resolution of the A/D converter 300 and the output power. An electric current detection precision (1305) represents the electric current detection precision of the A/D converter 300. The electric current detection precision is calculated on the basis of the quantization resolution of the A/D converter 300 and the output electric current.

An example of the operation state of the power transmission controller 211 in the power transmission mode is illustrated in FIG. 13A. In FIG. 13A, the output voltage of the power transmission controller 211 is 10 V, the output power thereof is 40 W, the output electric current thereof is 4 A, and the quantization resolution of the A/D converter 300 is 6 bits. The power detection precision is 0.625 W, which is obtained by dividing the output power of 40 W by 64 (2 to the sixth power), which is the number that can be distinguished with the quantization resolution of 6 bits. The electric current detection precision is 0.0625 A, which is obtained by dividing the output electric current of 4 A by 64 (2 to the sixth power), which is the number that can be distinguished with the quantization resolution of 6 bits. Accordingly, the power transmitting apparatus 100 is able to detect a change of 0.0625 A when transmitting a power of 40 W. Here, if it is assumed that the initial electric current of a power receiving apparatus is 5 mA (0.005 A), it is not possible to detect one power receiving apparatus on the basis of a change in the electric current, in the operation state illustrated in FIG. 13A.

An example of the operation state of the power transmission controller 211 in the detection mode is illustrated in FIG. 13B. FIG. 13B illustrates a state in which the output power is decreased to 0.05 W compared to the state illustrated in FIG. 13A. The electric current detection precision is 0.078 mA. In the operation state illustrated in FIG. 13B, an electric current of 5 mA, which is the initial electric current of a power receiving apparatus, is able to be easily detected. When the power transmission mode and the detection mode are compared, the quantization resolution of the A/D converter 300 is the same in both modes but the value of the electric current detection precision is lower in the detection mode than in the power transmission mode. This means that a slight electric current change is able to be detected in the detection mode more than in the power transmission mode. Therefore, an electric current change occurring as a result of a power receiving apparatus coming in proximity to the power transmitting apparatus 100 is able to be detected more easily. Consequently, it is concluded that the precision of detecting a power receiving apparatus in the detection mode is higher than the precision of detecting a power receiving apparatus in the power transmission mode.

Next, an example of a table stored in the power receiving apparatus information storage unit 210 is illustrated in FIG. 10. Address fields 1000 are used to store identification information of a power receiving apparatus that has been detected by the power transmitting apparatus 100. Set flag fields 1001 are used to store information regarding whether or not the power transmitting apparatus 100 has set a transmission quantity to be transmitted to a power receiving apparatus corresponding to identification information stored in the corresponding address field 1000. If such setting has been performed, "1" is stored, otherwise "0" is stored. In FIG. 10, the power transmitting apparatus 100 stores "Rx1", which is identification information of the first power receiving apparatus 101, and the corresponding set flag is set to "1". Therefore, the transmission quantity for the first power receiving apparatus 101 has already been set. The power transmitting apparatus 100 stores "Rx2", which is identification information of the second power receiving apparatus 102, and the corresponding set flag is set to "0". Therefore, the transmission quantity for the second power receiving apparatus 102 has not been set.

Examples of a table stored in the detection storage unit 203 are illustrated in FIGS. 11A to 11C. The detection unit 202 determines whether or not a power receiving apparatus exists on the basis of the result of electric current detection. I_now (1101) represents the current result of detection of an electric current, which is the current output of the A/D converter 300 and the units used are mA. I_before (1100) represents the value of an electric current generated by a power receiving apparatus to which power is being transmitted coming in proximity to the power transmitting apparatus 100. Note that as I_before, previous I_now that is the previous result of detection of an electric current, which is the previous output of the A/D converter 300, may be used. In a field 1102 for a change amount, the result obtained by subtracting I_before from I_now is stored. A detection resister (1103) is a 2-bit register indicating whether or not a power receiving apparatus has been detected on the basis of the change amount. The initial value of the detection register is "00". The value "01" of the detection register indicates that a power receiving apparatus has been detected. The value "10" of the detection register indicates that an object (for example, a foreign conductive object) other than a power receiving apparatus has been detected. The value "11" of the detection register indicates that no change has been seen in the value of the electric current, which means that no object has been detected. For example, in FIG. 11A, I_now is 10 mA and I_before is 5 mA. The change amount is 5 mA, which is obtained by subtracting 5 mA from 10 mA. The detection register has a value of "01", which means that a power receiving apparatus has been detected.

An example of a table stored in the system storage unit 207 is illustrated in FIG. 12. An initial electric current (1200) represents the value of an electric current in a state where a power receiving apparatus does not receive a high power from the power transmitting apparatus 100, that is, the value of a minimum electric current (the value of an electric current consumed by the communication unit 204, a control CPU (not illustrated), and the like of the power receiving apparatus) required to communicate control signals with the power transmitting apparatus 100. It is assumed that the initial electric current is equal to the value of an electric current change caused by a power receiving apparatus coming in proximity to the power transmitting apparatus 100.

An allowance (1201) represents the value of an allowance for a detection error caused by the detection unit 202 or for variations in the initial electric currents of power receiving apparatuses. For example, if the allowance is X mA, the power transmitting apparatus 100 allows a range between +X mA and −X mA as the detection error. A first number of apparatuses (1202) represents the number of power receiving apparatuses to which the power transmitting apparatus 100 is transmitting power. A second number of apparatuses (1210) represent the number of other power receiving apparatuses that have been newly detected in detection processing performed by the detection unit 202, which will be descried below. Here, "other power receiving apparatuses (or another power receiving apparatus)" is defined as power receiving apparatuses (or a power receiving apparatus) among power receiving apparatuses concerned, with which the power transmitting apparatus 100 has not negotiate for the transmission quantity. A third number of apparatuses (1203) represents the number of other power receiving apparatuses that have been detected by means of communication performed by the communication unit 204. A first transmission quantity (1204) represents the transmission quantity of a power that the power transmitting apparatus 100 transmits to a plurality of power receiving apparatuses or to a single power receiving apparatus in the power transmission mode. A second transmission quantity (1205) represents the transmission quantity of a power that is transmitted in the detection mode. In a prohibition flag (1206), "1" is stored in the case where it is determined that power transmission is to be prohibited as a result of determination processing performed by the determination unit 206, which will be described below.

Records 1207 to 1209 are examples of records each including the information elements described above. For example, the record 1208 indicates that the initial electric current is 5 mA. In this embodiment, for simplicity of description, it is assumed that the operating voltage of a power receiving apparatus is 10 V, which is equal to the output voltage of the power transmission controller 211. That is, a power receiving apparatus is able to transmit/receive control signals to/from the power transmitting apparatus 100 as long as the power receiving apparatus has power of 0.05 W, which is obtained by multiplying 5 mA, which is the initial electric current, by 10 V, which is the operating voltage. The allowance is 1 mA, the first number of apparatuses is 1, the second number of apparatuses is 1, and the third number of apparatuses is 1. The first transmission quantity is 40 W. The second transmission quantity is 0.05 W, which is obtained by multiplying 5 mA, which is obtained by multiplying the initial electric current (5 mA) by the first number of apparatuses (1 unit), by the operating voltage (10 V). The way of determining these elements will be described in detail below.

Figure 8:
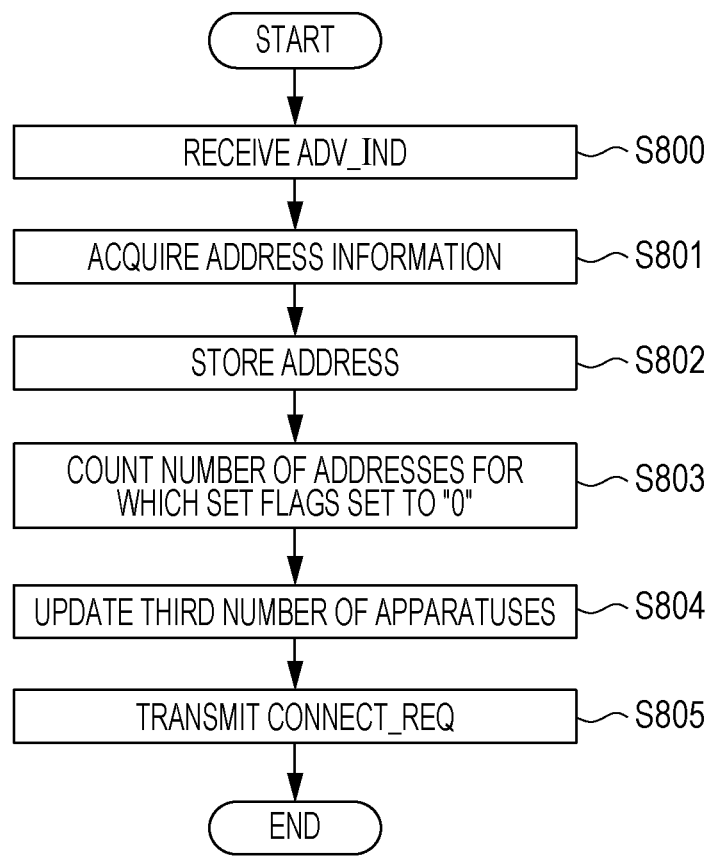
FIG. 8 is a flowchart illustrating wireless connection processing.
Figure 9:
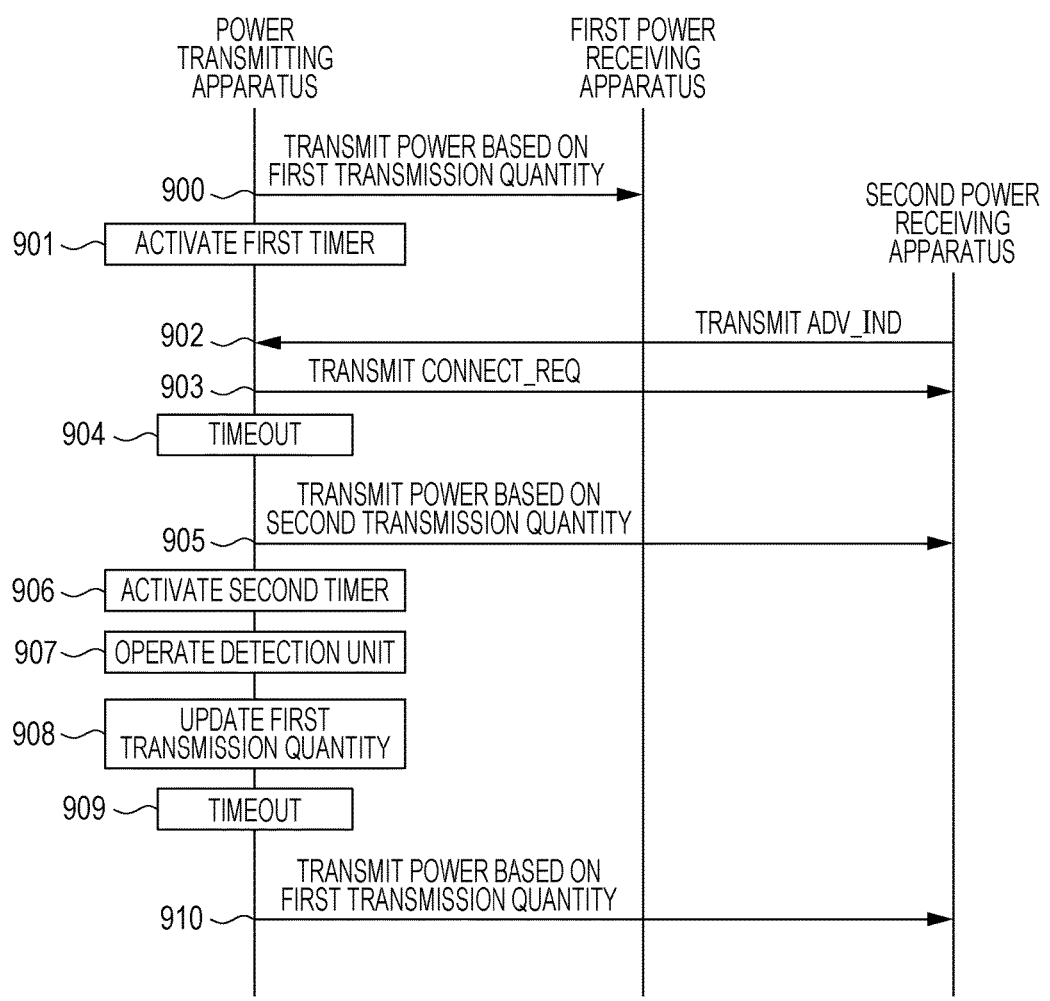
FIG. 9 is a sequence chart relating to a wireless power transmission system.

Operations performed by the power transmitting apparatus 100 having the configuration described above will be described with reference to FIGS. 1A and 1B, and FIGS. 4 to 9. Description will be given below while assuming a state in which the power transmitting apparatus 100 transmits power to the first power receiving apparatus 101 as illustrated in FIG. 1A. Then, description will be given of a case where the power transmitting apparatus 100 detects the second power receiving apparatus 102 while transmitting power to the first power receiving apparatus 101 and further transmits power to the second power receiving apparatus 102. Note that FIG. 9 is a sequence chart relating to the wireless power transmission system.

Figure 4:
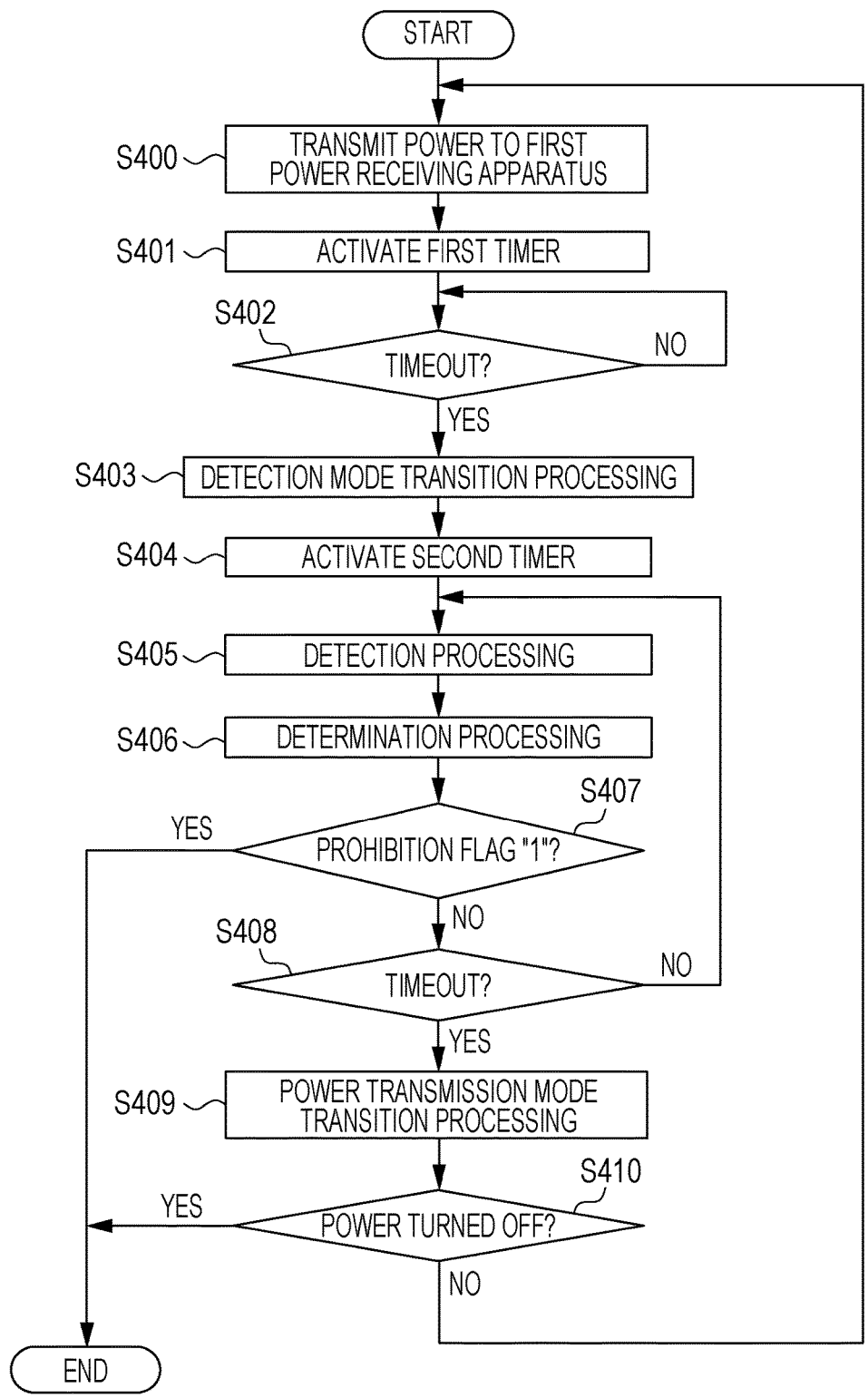
FIG. 4 is a flowchart illustrating operations performed by a power transmitting apparatus.

FIG. 4 is a flowchart illustrating operations performed by the power transmitting apparatus 100. First, the controller 201 of the power transmitting apparatus 100 reads the output power in the power transmission mode from the system storage unit 207 in order to transmit power to the first power receiving apparatus 101. The controller 201 controls the power transmission controller 211 in accordance with the information that has been read and transmits power to the first power receiving apparatus 101 in the power transmission mode (S400, 900). It is assumed that the power transmitting apparatus 100 has already exchanged, with the first power receiving apparatus 101, signals relating to wireless power transmission by means of wireless communication performed via the communication unit 204. Examples of signals relating to wireless power transmission include a signal used for a power transmission request, a signal used for a negotiation relating to the transmission power, and a signal including information regarding a supported wireless communication standard or the like. The record 1207 in FIG. 12 is an example of the operation state in the power transmission mode. The power transmitting apparatus 100 transmits power at 40 W, which is the first transmission quantity, that is, the output power in the power transmission mode. The controller 201 activates the first timer 205 in response to the start of power transmission (S401, 901). The first timer 205 has a function of defining a time period (first predetermined time period) during which the power transmitting apparatus 100 transmits a power equal to the output power (first transmission quantity) in the power transmission mode. That is, the first timer 205 is used to perform control so that the power transmitting apparatus 100 operates in the power transmission mode for the first predetermined time period.

On the other hand, the second power receiving apparatus 102 is placed on the power transmitting apparatus 100 as illustrated in FIG. 1B in order to start wireless power transmission with the power transmitting apparatus 100, and makes a request for transmission of power to the power transmitting apparatus 100. The power transmitting apparatus 100 performs wireless connection processing with the second power receiving apparatus 102 in response to the request for power transmission from the power receiving apparatus 102 (902, 903). Here, it is assumed that a request for power transmission is made by using an ADV_IND packet, which is a type of advertising packet defined by BT 4.0 standard. In an ADV_IND packet, address information of the apparatus, which supports BT 4.0, information regarding a service supported by the high-level application, and the like are stored.

Here, wireless connection processing will be described with reference to a flowchart illustrated in FIG. 8. When the communication unit 204 receives an ADV_IND packet (S800) from the second power receiving apparatus 102, the communication unit 204 acquires address information from the packet (S801). The controller 201 stores the address information acquired from the communication unit 204 in the address field 1000 of the power receiving apparatus information storage unit 210 (S802). In this case, "Rx2", which is the address of the second power receiving apparatus 102, is stored. Here, the power transmitting apparatus 100 has not determined the transmission quantity for the second power receiving apparatus 102 and therefore the corresponding set flag is set to "0".

Subsequently, the controller 201 counts the number of addresses in the address fields 1000 for which corresponding set flags are set to "0" (S803). In FIG. 10, there is only one address "Rx2" for which the corresponding set flag is set to "0". The controller 201 updates the third number of apparatuses in the system storage unit 207 to "1", which is the result of the counting (S804). As a result of processing in S803 and S804, the power transmitting apparatus 100 is able to know the number of other power receiving apparatuses on the basis of the information acquired via the communication unit 204. The communication unit 204 transmits to the second power receiving apparatus 102 a CONNECT_REQ packet used for wireless connection with the second power receiving apparatus 102 in response to the ADV_IND packet (S805, 903), and ends the operations.

The operation state of the power transmission controller 211 at the time (903) when wireless connection processing has been completed is illustrated in FIG. 13A. At this point in time, transmission of power to the first power receiving apparatus 101 is being performed in the power transmission mode and therefore the output power (1301) is 40 W, which is equal to the first transmission quantity. In this case, the quantization resolution of the A/D converter 300 is 6 bits and therefore the electric current detection precision of the A/D converter 300 is 0.0625 A (62.5 mA). A change in the value of the electric current generated by a power receiving apparatus coming in proximity to the power transmitting apparatus 100 is 5 mA as indicated by the initial electric current (1200) and therefore, in the power transmission mode, it is not possible to detect the second power receiving apparatus 102 on the basis of the electric current change.

When the first timer 205 has timed out (Yes in S402, 904), the controller 201 makes the power transmission controller 211 start detection mode transition processing (S403).

Figure 5:
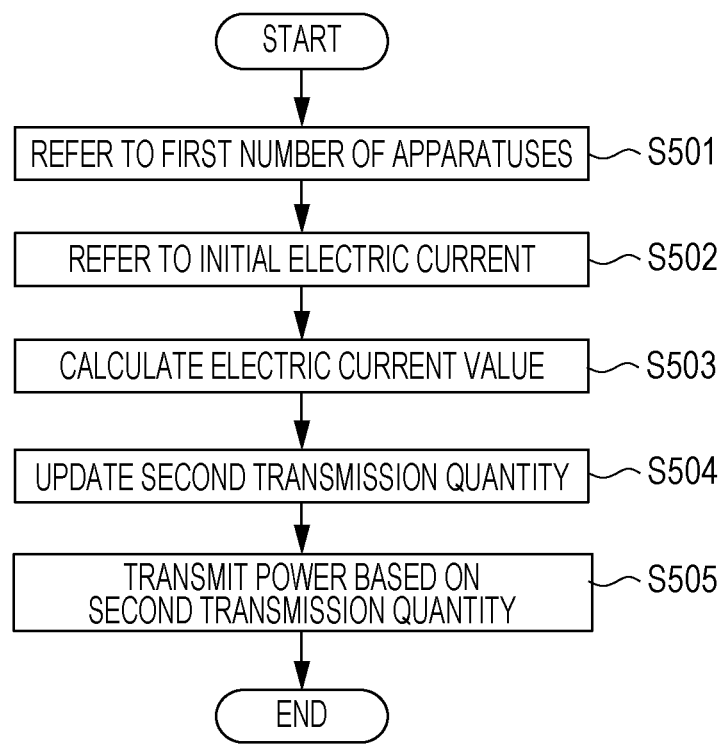
FIG. 5 is a flowchart illustrating detection mode transition processing.
Figure 6:
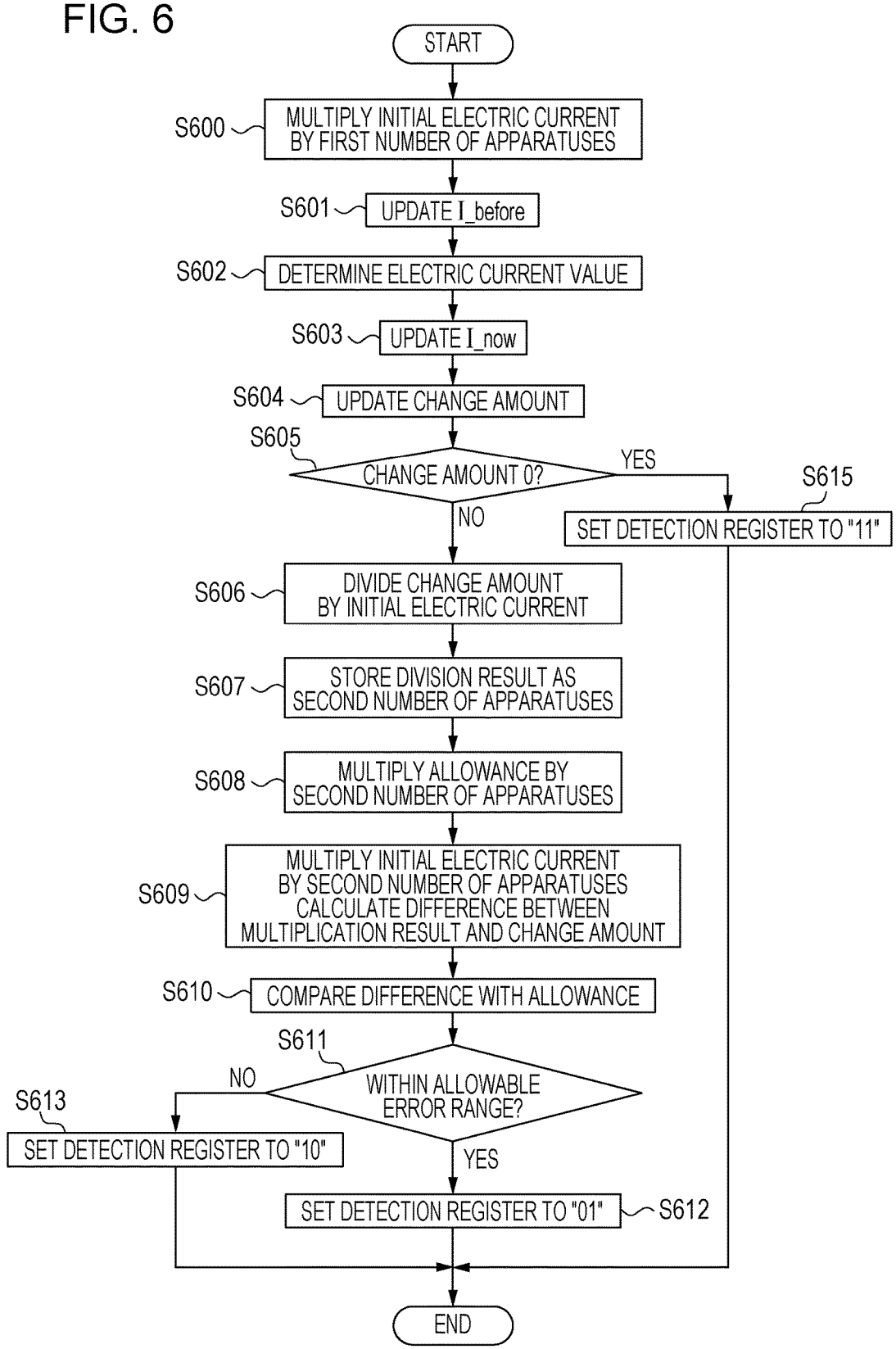
FIG. 6 is a flowchart illustrating detection processing.
Figure 7:
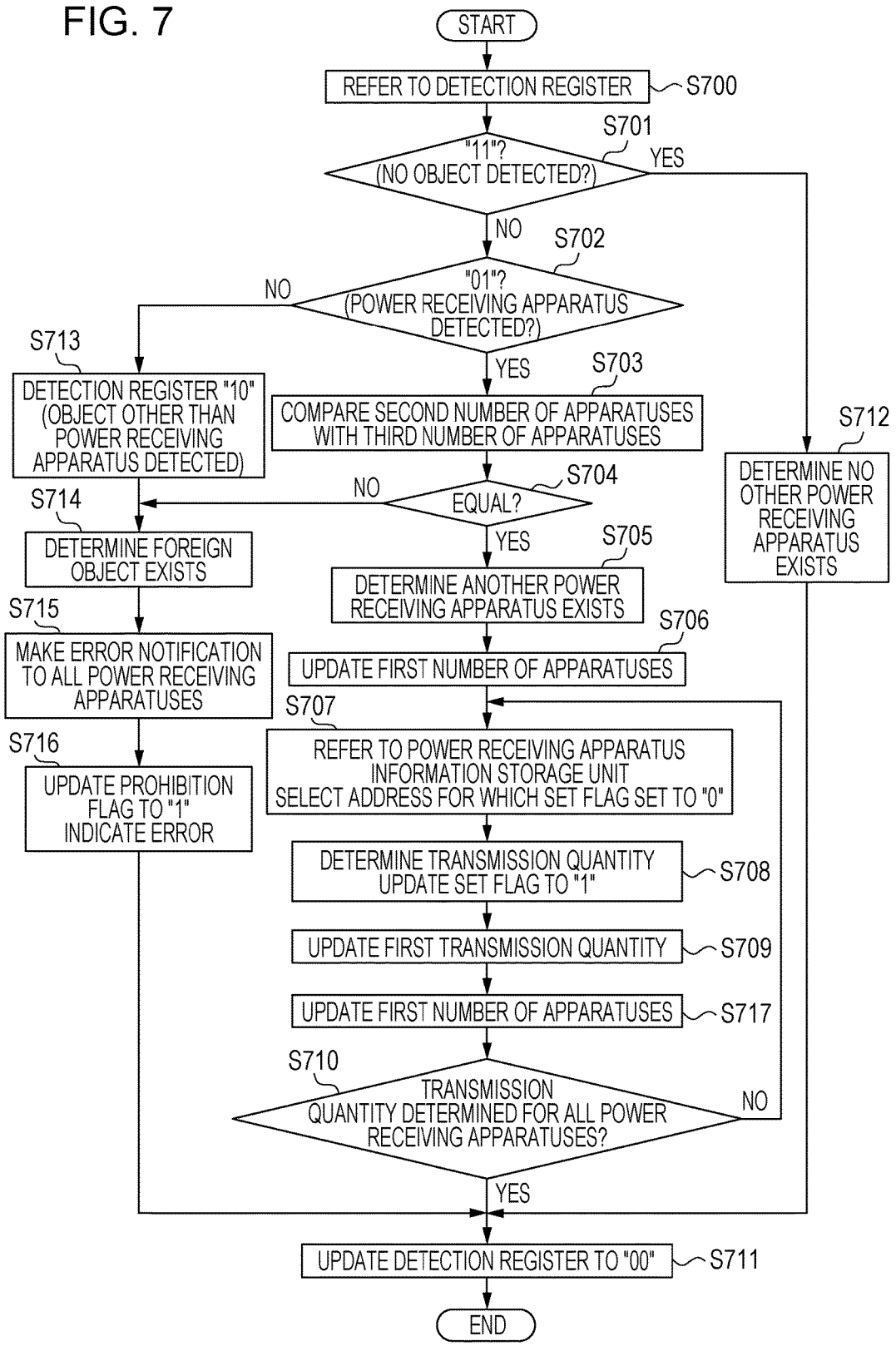
FIG. 7 is a flowchart illustrating determination processing.

Detection mode transition processing will be described in detail with reference to a flowchart illustrated in FIG. 5. First, the power transmission controller 211 refers to the first number of apparatuses in the system storage unit 207 and knows the number of power receiving apparatuses to which power is currently being transmitted (S501). The power transmission controller 211 refers to the initial electric current (S502) and calculates the value of a minimum electric current required for all power receiving apparatuses to which power is currently being transmitted to perform communication (S503), which will be specifically described while referring to the record 1207, which indicates the state of the system storage unit 207 at the point 903 in FIG. 9. The first number of apparatuses is "1" and the initial electric current is 5 mA. The value of a minimum electric current required for all power receiving apparatuses (in this case, the first power receiving apparatus 101 only) to which power is currently being transmitted to perform communication is 5 mA, which is obtained by multiplying the initial electric current by the first number of apparatuses. As described above, a power receiving apparatus operates at a voltage of 10 V and therefore the value of 0.05 W is obtained as a result of multiplying the initial electric current of 5 mA by the operating voltage of 10V. That is, as long as the power transmitting apparatus 100 supplies a power of 0.05 W to the first power receiving apparatus 101, the first power receiving apparatus 101 is able to transmit/receive control signals to/from the power transmitting apparatus 100 and the minimum operations of the first power receiving apparatus 101 is able to be ensured. In the detection mode, a power equal to the power consumption of a power receiving apparatus to which power is being transmitted is supplied to the power receiving apparatus and therefore a loss, such as a switching loss, does not occur, which has an effect of suppressing the decrease in the power transmission efficiency.

The power transmission controller 211 updates the second transmission quantity to the thus calculated value of 0.05 W (S504). The output power (second transmission quantity) in the detection mode is set to a value equal to power consumption of a power receiving apparatus to which power is being transmitted. However, if the power transmission efficiency is not taken into consideration, setting is not limited to the above case as long as the quantization resolution that allows detection of other power receiving apparatuses is maintained, which will be described in detail below. The power transmission controller 211 starts to transmit power to the first power receiving apparatus 101 and the second power receiving apparatus 102 on the basis of the second transmission quantity that has been set (S505, 905), and the detection mode transition processing ends.

The operation state of the power transmission controller 211 when the detection mode transition processing ends and switching from the power transmission mode to the detection mode occurs (905) is illustrated in FIG. 13B. The output power (1301) in the detection mode is 0.05 W, which is equal to the second transmission quantity. In this case, the quantization resolution of the A/D converter 300 is 6 bits and therefore the electric current detection precision of the A/D converter 300 is 0.078 mA. The value of an electric current change caused by a power receiving apparatus coming in proximity to the power transmitting apparatus 100 is 5 mA as indicated by the initial electric current (1200), which means that a precision that is sufficient to detect the second power receiving apparatus 102 on the basis of the electric current change is achieved.

Subsequently, the controller 201 activates the second timer 208 (S404, 906), and starts detection processing (S405, 907). The second timer 208 has a function of defining a time period (second predetermined time period) during which the power transmitting apparatus 100 transmits power on the basis of the second transmission quantity, which is the output power in the detection mode. That is, the second timer 208 is used to perform control so that the power transmitting apparatus 100 operates in the detection mode for the second predetermined time period. Detection processing will be described in detail with reference to a flowchart illustrated in FIG. 6.

First, the detection unit 202 multiplies the initial electric current by the first number of apparatuses, which is the number of power receiving apparatuses to which power is being transmitted (S600), and updates I_before in the detection storage unit 203 with the resulting value (S601). The detection unit 202 determines the value of the current electric current from the result of the output of the A/D converter 300 (S602), and updates I_now with the determined value (S603). Subsequently, the detection unit 202 subtracts I_before from I_now and updates the change amount with the resulting value (S604). The detection unit 202 determines whether or not the change amount is 0 (S605). If the change amount is 0 (Yes in S605), the detection unit 202 determines that no object has been detected and sets the detection register to "11" (S615). On the other hand, if the change amount is not 0 (No in S605), the detection unit 202 divides the change amount by the initial electric current (S606) in order to calculate, from the change amount, the number of power receiving apparatuses that have been newly placed on the power transmitting apparatus 100. The detection unit 202 stores the result of division performed in S606 in the system storage unit 207 as the second number of apparatuses (S607). The detection unit 202 performs processing for determining whether or not the result of detection of a power receiving apparatus is correct on the basis of the allowance in order to take into consideration a measurement error. The detection unit 202 multiplies the allowance retained in the system storage unit 207 by the second number of apparatuses that has been stored (S608). Here, it is assumed that the result of multiplication performed in S608 is denoted by a multiplication result A. The detection unit 202 multiplies the initial electric current by the second number of apparatuses (S609). Here, it is assumed that the result of multiplying the initial electric current by the second number of apparatuses is denoted by a multiplication result B. The detection unit 202 calculates the difference between the multiplication result B and the change amount that has been detected (S609). Here, it is assumed that the resulting difference is denoted by a resulting difference A. The detection unit 202 compares the multiplication result A with the resulting difference A (S610). Specifically, the detection unit 202 calculates the difference between the resulting difference A and the multiplication result A. It is assumed that the value obtained by subtracting the multiplication result A from the resulting difference A is denoted by a resulting difference B. If the resulting difference B has a positive value, the change is within the allowable error range (Yes in S611). Therefore, the detection unit 202 determines that a power receiving apparatus has been detected, and sets the detection register to "01" (S612). On the other hand, if the resulting difference B has a negative value, the change is outside the allowable error range (No in S611). Therefore, the detection unit 202 determines that at least a foreign object has been detected, and sets the detection register to "10" (S613).

A specific example of the detection processing will be described with reference to FIG. 11A. Description will be given while referring to the record 1208 in FIG. 12 and FIG. 11A. The value of 5 mA, which is the result obtained by multiplying the initial electric current of 5 mA by "1", which is the first number of apparatuses, is stored in I_before (S600, S601). The value of the current electric current is determined from the result of the output of the A/D converter 300 (S602), and I_now is updated with the determined value (S603). Here, it is assumed that both of the first power receiving apparatus 101 and the second power receiving apparatus 102 operate at 5 mA, which is the initial electric current. In FIG. 11A, the value obtained as a result of determination performed in S602 is 10 mA, which is obtained by adding 5 mA, which is the operating electric current of the first power receiving apparatus 101 and 5 mA, which is the operating electric current of the second power receiving apparatus 102. As illustrated in FIG. 11A, the change amount is 5 mA, which is obtained by subtracting 5 mA (I_before) from 10 mA (I_now) (S604). Since the change amount is not 0 (No in S605), the detection unit 202 calculates the number of other power receiving apparatuses that can be estimated from the change amount. Specifically, the change amount (5 mA) is divided by the initial electric current (5 mA) (S606) and "1", which is the result of the division, is stored in the system storage unit 207 as the second number of apparatuses (S607).

Subsequently, whether or not the result determined from the value of the electric current in S607 is a reliable value is determined by comparing the result with a value based on the allowance. First, the allowance in the record 1208 (1 mA, which is the allowance for one power receiving apparatus) is multiplied by "1", which is the second number of apparatuses in the record 1208 (S608).

Subsequently, the detection unit 202 refers to the record 1208, obtains "5 mA" by multiplying the initial electric current (5 mA) by "1", which is the second number of apparatuses, calculates the difference between the change amount (5 mA) and the multiplication result, and obtains the calculation result, which is 0 mA (S609). The detection unit 202 compares the difference with the allowance (S611). Here, the difference is 0 mA and within the range of 1 mA, which is the allowance (Yes in S611). At this point, the detection unit 202 determines that the second number of apparatuses stored in S607 which has been determined on the basis of the result of detection of the electric current is reliable, and updates the detection register to "01" (S612). When the detection processing ends, the controller 201 makes the determination unit 206 start determination processing (S406).

In determination processing, determination on three cases are performed, the three cases relating to operations performed by the power transmission controller 211. The three cases include a case of not performing power transmission, a case of performing power transmission while updating the first transmission quantity, and a case of performing power transmission without updating the first transmission quantity. Especially, in the case of performing power transmission while updating the first transmission quantity, it is confirmed with certainty that the number of other power receiving apparatuses (third number of apparatuses) determined by the communication unit 204 is equal to the number of other power receiving apparatuses (second number of apparatuses) determined by the detection unit 202. Determination processing will be described with reference to a flowchart illustrated in FIG. 7. First, the determination unit 206 refers to the detection register (S700). If the value of the detection register is "11" (Yes in S701), that is, if no object has been detected in the detection processing, the determination unit 206 determines that no other power receiving apparatus exists (S712), and updates the detection register to "00", which is the initial value (S711). Then, the determination processing ends. In this case, the determination unit 206 determines that power transmission is to be performed without updating the first transmission quantity. If the value of the detection register is "10" (S713), that is, if an object other than a power receiving apparatus has been detected in the detection processing, the determination unit 206 determines that a foreign object exists (S714). Existence of a foreign object may lead to a risk of heating of the foreign object caused by a power transmitted by the power transmitting apparatus 100. Therefore, the communication unit 204 makes an error notification to all power receiving apparatuses information on which are stored in the power receiving apparatus information storage unit 210 (S715). The determination unit 206 updates the prohibition flag to "1" and determines that power transmission is to be prohibited (S716). The determination unit 206 makes the notification unit 212 output an error indication or an error sound to thereby notify a user of the error state (S716). The flow proceeds to S711 and the determination processing ends. In this case, the determination unit 206 determines that a relatively high power is not to be transmitted (which means the power transmission mode) because of the error state.

If the detection register is set to "01", that is, if a power receiving apparatus has been detected in the detection processing (No in S701, Yes in S702), the flow proceeds to S703. The determination unit 206 compares the second number of apparatuses (the number of power receiving apparatuses detected in the detection processing) stored in the system storage unit 207 with the third number of apparatuses (the number of power receiving apparatuses detected by means of communication) stored in the system storage unit 207 (S703). If the number of other power receiving apparatuses (the third number of apparatuses) detected by means of communication performed by the communication unit 204 is not equal to the number of other power receiving apparatuses (the second number of apparatuses) detected by the detection unit 202 (No in S704), there may be a power receiving apparatus around the power transmitting apparatus 100, with which control signals have not been exchanged. Also, there is a possibility that a power receiving apparatus is not placed in a position where power transmission from the power transmitting apparatus 100 is possible although exchange of control signals has been performed. Furthermore, there is a possibility that a foreign object exists. If power transmission continues in such cases, there is a possibility that normal power transmission is not performed. Therefore, the flow proceeds to S714 and error processing is performed (S715, S716). In this case, the determination unit 206 determines that power transmission with a relatively high power (which means in the power transmission mode) is not to be performed because of the error state. On the other hand, if the number of other power receiving apparatuses (the third number of apparatuses) detected by means of communication performed by the communication unit 204 is equal to the number of other power receiving apparatuses (the second number of apparatuses) detected by the detection unit 202 (Yes in S704), the determination unit 206 determines that another power receiving apparatus exists to which power is to be transmitted (S705).

Subsequently, the determination unit 206 refers to the power receiving apparatus information storage unit 210 and selects an address for which the corresponding set flag is set to "0" (S707). That is, the determination unit 206 selects a power receiving apparatus for which the transmission quantity has not been determined. In FIG. 10, the set flag corresponding to "Rx2", which is the address of the second power receiving apparatus 102, is set to "0" and therefore "Rx2" is selected. The determination unit 206 negotiates with the second power receiving apparatus 102 via the communication unit 204 and determines the transmission quantity for the second power receiving apparatus 102. In this embodiment, it is assumed that the transmission quantity is determined in such a way that a request for power is made by the second power receiving apparatus 102 and the power transmitting apparatus 100 determines whether or not the power transmitting apparatus 100 accepts the request. Here, it is determined that the transmission quantity for the second power receiving apparatus 102 is 10 W, and the set flag is updated to "1" (S708). The determination unit 206 updates the first transmission quantity to 50 W, which is obtained by adding 40 W, which is the power that has been transmitted to the first power receiving apparatus 101, that is, the first transmission quantity, and 10 W, which is the power determined to be transmitted to the second power receiving apparatus 102 (S709, 908, 1209).

Subsequently, the determination unit 206 refers to the power receiving apparatus information storage unit 210, counts the number of addresses for which the corresponding set flags are set to "1", and thereafter updates the first number of apparatuses (S717). Specifically, there are two addresses, that is, "Rx1" and "Rx2", for which the corresponding set flags are set to "1", the set flag for "Rx2" having been updated to "1" in S708, and therefore the first number of apparatuses in the record 1209 is updated to "2".

The determination unit 206 refers to the set flags in the power receiving apparatus information storage unit 210 and, if the transmission quantity has not been determined for all power receiving apparatuses (No in S710), the flow returns to S707 and processing in S707 and the subsequent steps is performed. If the transmission quantity has been determined for all power receiving apparatuses (Yes in S710), the determination unit 206 updates the detection register to "00" (S711), and the determination processing ends.

When the determination processing ends (S406), the controller 201 refers to the prohibition flag (S407). If the prohibition flag is "1" (Yes in S407), power transmission based on the first transmission quantity is not performed and the processing ends. In this case, an object (foreign objet) that is not a power receiving apparatus exists on the power transmitting apparatus 100 and therefore the notification unit 212 may indicate the error to a user and also display a message that prompts a user to remove the foreign object. If the prohibition flag is "0" (No in S407), the controller 201 determines whether or not the second timer 208 has timed out (S408). If it is determined in S408 that the second timer 208 has not timed out (No in S408), the detection processing in S405 is performed again. If it is determined in S408 that the second timer 208 has timed out (Yes in S408, 909), the controller 201 makes the power transmission controller 211 perform power transmission mode transition processing (S409).

The power transmission controller 211 refers to the first transmission quantity (50 W in the above example) in the system storage unit 207, and starts to transmit power at the output power of 50 W to the first power receiving apparatus 101 and to the second power receiving apparatus 102 (910). When the controller 201 ends power transmission mode transition processing in S409, the controller 201 performs the processing in S400 and the subsequent steps again as long as the power of the power transmitting apparatus 100 is not turned off (No in S410). Here, the controller 201 attempts to detect an operation for turning off the power after S409, however, the processing in S410 may be performed at any point in time. The controller 201 ends the processing in response to detection of an operation for turning off the power (Yes in S410).

As described above, the power transmitting apparatus 100 of this embodiment periodically transitions to the detection mode in which power transmission is performed at the output power smaller than the output power in the power transmission mode, even if the power transmitting apparatus 100 is transmitting power to the first power receiving apparatus 101 in the power transmission mode. Accordingly, it becomes possible to detect an electric current change caused by the second power receiving apparatus 102 coming in proximity to the power transmitting apparatus 100, the electric current change being unable to be detected in the power transmission mode, by performing power transmission with the output power in the detection mode. According to this embodiment, it is possible to detect the second power receiving apparatus 102 during transmission of power to the first power receiving apparatus 101. According to this embodiment, it is possible to detect the second power receiving apparatus 102 during transmission of power to the first power receiving apparatus 101 without using an A/D converter that has a relatively high quantization resolution. In this embodiment, during transmission of power to the first power receiving apparatus 101, alternate switching between the power transmission mode for transmission of power to the first power receiving apparatus 101 and the detection mode for detecting the second power receiving apparatus 102 is performed, and the output voltage in the detection mode is made smaller than the output voltage in the power transmission mode. As a result, the noise level in the detection mode becomes smaller than the noise level in the power transmission mode and therefore a circuit or processing for noise cancellation becomes less required. Therefore, according to this embodiment, it is possible to reduce costs and it is also possible to reduce the processing time because of the decreased necessity for noise cancellation processing, which contributes to improvement of usability.

Furthermore, the power transmitting apparatus 100 of this embodiment has the power transmission mode in which the output power is high and therefore, in the case where a power receiving apparatus to which power is transmitted is an apparatus that receives power for charging a battery, for example, the charging time is reduced. In the power transmission mode, the output power is high and therefore, in the case where a power receiving apparatus to which power is transmitted is an apparatus that operates by using the received power, for example, it is possible to transmit, by radio, power that is sufficient for the operation. However, during power transmission in the power transmission mode, the output power is high and therefore the power transmitting apparatus 100 is unable to detect a small power that is generated therein as a result of a power receiving apparatus coming in proximity thereto. Accordingly, the power transmitting apparatus 100 is unable to detect the power receiving apparatus, which means that the power transmitting apparatus 100 is unable to detect the second and subsequent power receiving apparatuses, resulting in a drawback. Therefore, the power transmitting apparatus 100 of this embodiment has the detection mode in which the output power is lower than the output power in the power transmission mode. The output power is low in the detection mode and therefore the power transmission efficiency for the first power receiving apparatus 101, to which power is being transmitted, becomes low. However, it is possible to newly detect the second power receiving apparatus 102 during transmission of power to the first power receiving apparatus 101 and to transmit power also to the second power receiving apparatus 102. Therefore, the overall power transmission efficiency of the system is able to be improved. The power transmitting apparatus 100 of this embodiment performs alternate switching between the detection mode and the power transmission mode and therefore the power transmission efficiency thereof during power transmission becomes low, however, another power receiving apparatus is able to be promptly detected. Therefore, by alternate switching between the detection mode and the power transmission mode, it is possible to shorten a time period during which a power receiving apparatus that exist within an area where power transmission by the power transmitting apparatus 100 is possible is not able to be detected.

The power transmitting apparatus 100 is configured to acquire the number of other power receiving apparatuses by using both of the detection unit 202 and the communication unit 204 and not to perform power transmission on the basis of the first transmission quantity if the number acquired by the detection unit 202 is not equal to the number acquired by the communication unit 204 in S704. In doing so, even in the case where another power receiving apparatus does not exist but an electric current generated by a foreign object coming in proximity to the power transmitting apparatus 100 accidentally matches the initial electric current, the communication unit 204 does not erroneously detect the other power receiving apparatus. Therefore, it is possible to perform error indication.

Note that, in this embodiment, an ADV_IND packet is used as a power transmission request message from a power receiving apparatus, and a CONNECT_REQ packet is used as a response message, however, other advertising packets defined in BT 4.0 standard may be used. Alternatively, other predetermined signals may be used.

In this embodiment, the output 305 of the power transmission controller 211 has a constant voltage, the detection unit 202 is configured to determine the value of the electric current of the output 305, and the power transmission controller 211 is configured to control the value of the electric current of the output 305. However, other configurations or other quantities of electricity may be used as long as operations performed by the power transmission controller 211 are able to be known. For example, it is assumed that the output 305 has a constant electric current. Then, the detection unit 202 may be configured to determine the value of the voltage of the output 305, and the power transmission controller 211 may be configured to control the value of the voltage of the output 305. Alternatively, it is assumed that the output impedance of the power transmission controller 211 is specified to a specific value. Then, an amplifier may be used in which both of the electric current and voltage of the output 305 change while the output impedance is kept unchanged. In this case, the detection unit 202 may be configured to determine the values of the voltage and electric current of the output 305, and the power transmission controller 211 may be configured to control the values of the voltage and electric current of the output 305. That is, a high-frequency amplifier having an output impedance of 50 ohms, an E-class amplifier, or a D-class amplifier may be used, for example. In this embodiment, the detection unit 202 is configured to detect the quantity of electricity of the output 305 of the power transmission controller 211, however, the detection unit 202 may be configured to detect the quantity of electricity of the input 303.

In this embodiment, power transmission based on the second transmission quantity is performed, the power transmission being triggered by the first timer 205 having timed out. However, such power transmission may be triggered by detection of a power receiving apparatus (reception of an ADV_IND packet) by the communication unit 204 in S800. Transition to the detection mode may be triggered by detection of a power receiving apparatus by means of communication, update processing (S612, S613, S615) of the detection register may be performed by the detection unit 202, and thereafter transition processing in S801 may be performed. In this case, if an object has not been detected in the detection processing, the power transmitting apparatus 100 need not establish a BT connection with a power receiving apparatus that has transmitted a power transmission request. As a result, it is possible to suppress an erroneous operation in the case where a power receiving apparatus that has transmitted a power transmission request has been placed on another power transmitting apparatus.

The communication unit 204 may support other communication standards, such as a wireless local area network (LAN) standard (Institute of Electrical and Electronics Engineers (IEEE) 802.11 series) or a near field communication (NFC) standard. The power transmitting apparatus 100 is configured to simultaneously perform transmission of power to both of the first power receiving apparatus 101 and the second power receiving apparatus 102, however, such power transmission may be performed in a time-sharing manner.

Power transmission based on the first transmission quantity is performed (transition to the power transmission mode occurs) when the second timer 208 has timed out. However, if the transmission quantity has been determined for all power receiving apparatuses (Yes in S710), the power transmission may be performed without waiting for the timeout of the second timer 208. As a result, it is possible to immediately start transmission of power to a power receiving apparatus and therefore the charging period or a period during which power supply stops is able to be shortened.

The initial electric current used for calculating the second transmission quantity or the second transmission quantity itself may be specified in advance and be shared among the power transmitting apparatus 100 and power receiving apparatuses at the time of designing the apparatuses. In this case, of an assumed electric current change on the basis of which a foreign object is able to be detected and an assumed electric current change caused by a power receiving apparatus coming in proximity to the power transmitting apparatus 100, the smaller one may be specified as the initial electric current, which is effective in that both a foreign object and a power receiving apparatus is able to be detected.

In the case where a power receiving apparatus does not have a secondary battery and operates with power supplied from the power transmitting apparatus 100, it is desired that a period during which power transmission is not performed is decreased as much as possible. In this case, the power transmitting apparatus 100 may be configured to define data used to know whether or not a power receiving apparatus has a secondary battery and to communicate the data via the communication unit 204. The power transmitting apparatus 100 may determine whether or not the second timer 208 is to be activated in S404 on the basis of whether or not the power receiving apparatus has a secondary battery. The power transmitting apparatus 100 and a power receiving apparatus may exchange information regarding their own capabilities with each other via the communication unit 204 and share a timeout value specified on the basis of such information. The second timer 208 need not be provided and transition to the power transmission mode may occur when it is determined in S710 in the determination processing that the transmission quantities of all detected power receiving apparatuses have been set.

In the detection mode, the output of power is performed on the basis of a value corresponding to the operating power of the power receiving apparatus. However, if the power transmitting apparatus 100 is able to detect a power receiving apparatus coming in proximity thereto on the basis of other sensor output, such as the mass of the power receiving apparatus, for example, the output power in the detection mode may be set to 0.

In this embodiment, a case has been described where the second power receiving apparatus is detected during transmission of power to the first power receiving apparatus. The power transmitting apparatus 100 of this embodiment may perform operations, in the case where the third, fourth, . . . , and N-th (N is any natural number) power receiving apparatuses are placed on the power transmitting apparatus 100, for detecting these power receiving apparatuses. In this case, the power transmitting apparatus 100 sets the total power for all power receiving apparatuses to which power is being transmitted as the output power in the power transmission mode, and sets the output power in the detection mode similarly as in this embodiment to thereby make it possible to detect yet another power receiving apparatus during transmission of power to a plurality of power receiving apparatuses.

Other Embodiments

In the above-described embodiment, the second transmission quantity is determined on the basis of the first number of apparatuses (current number of power receiving apparatuses), however, determination is not limited to this. For example, the second transmission quantity may be determined on the basis of the quantization resolution of the A/D converter 300 and a change in the quantity of electricity generated by a power receiving apparatus coming in proximity to the power transmitting apparatus 100. An example of another way of determining the second transmission quantity in the case of performing wireless power transmission under the conditions illustrated in FIG. 14 will be described. In FIG. 14, the number of power receiving apparatuses (1400) represents the number of power receiving apparatuses to which the power transmitting apparatus 100 is able to simultaneously transmit power. According to the number of power receiving apparatuses (1400), the power transmitting apparatus 100 is able to transmit power to five power receiving apparatuses. A quantization resolution (1401) is the quantization resolution of the A/D converter 300. According to the quantization resolution (1401), the quantization resolution of the A/D converter 300 is 6 bits and therefore the A/D converter 300 is able to distinguish 64 values of the electric current. A power detection precision (1402) represents a power detection precision required to detect a power receiving apparatus. Here, the power detection precision indicates a power with which the power receiving apparatus is able to perform minimum operations. In this example, the power receiving apparatus is able to exchange the control signals with the power transmitting apparatus 100 with a power of 0.05 W. The power with which a power receiving apparatus is able to perform minimum operations is hereinafter referred to as an initial power. A maximum initial power (1403) is a value obtained by multiplying the initial power by the number of power receiving apparatuses to which the power transmitting apparatus 100 is able to simultaneously transmit power. As long as the power transmitting apparatus 100 performs power transmission with a power equal to or larger than the maximum initial power, even if the power transmitting apparatus 100 transmits power to the upper limit number of power receiving apparatuses to which power transmission is possible, all the power receiving apparatuses are able to perform minimum operations. The maximum initial power (1403) indicates that, as long as a power of 0.25 W is supplied from the power transmitting apparatus 100, five power receiving apparatuses are able to exchange control signals with the power transmitting apparatus 100. An electric current detection precision (1404) is a precision of detecting an electric current required to detect a power receiving apparatus, which is a value obtained by dividing the power detection precision by a power transmission voltage (1405). The electric current detection precision (1404) indicates that, if the detection precision is 0.005 A, the power transmitting apparatus 100 is able to detect one power receiving apparatus.

Another way of determining the second transmission quantity will be described while assuming the above-described case. Here, it is assumed that the second transmission quantity is A W. It is sufficient that the detection precision at the time of power transmission at A W is 0.05 W or less as indicated by the power detection precision (1402). Therefore, it is sufficient that A is 3.2 or less, which is obtained by multiplying 0.05 W by 64 (6 bits), which is the quantization resolution (1401) of the A/D converter 300. Here, a power of 3.2 W is determined to be the second transmission quantity. In other words, the second transmission quantity (1406) is set to the maximum transmission quantity that satisfies the detection precision for detecting a power receiving apparatus.

As described above, in the case where the second transmission quantity (1406) is set to the maximum transmission quantity that satisfies the detection precision, when the second transmission quantity is compared with the maximum initial power (1403), the second transmission quantity exceeds the maximum initial power. Therefore, also in the detection mode, it is possible to perform power supply that ensures the minimum operations for a power receiving apparatus to which power is being transmitted. In the case where the battery of a power receiving apparatus that is newly placed on the power transmitting apparatus 100 is exhausted such that even exchange of control signals is not able to be performed, if the maximum transmission quantity that satisfies the detection precision is provided, a power required for exchange of control signals is able to be supplied to the power receiving apparatus. Therefore, power transmission in the detection mode to a power receiving apparatus having an exhausted battery enables exchange of control signals and therefore it is possible to start power transmission in the power transmission mode.

When the maximum transmission quantity that satisfies the detection precision is compared with the first transmission quantity in the power transmission mode, if the maximum transmission quantity that satisfies the detection precision is larger than the first transmission quantity, the second transmission quantity may be set to a quantity equal to the first transmission quantity. For example, it is assumed that the maximum transmission quantity that satisfies the detection precision is 3.2 W (1406) and the first transmission quantity is 2 W. In this case, the power transmission controller 211 updates the second transmission quantity to 2 W (that is, the first transmission quantity) in S504. In doing so, the power transmission efficiency is improved compared with the case where the second transmission quantity is set to 3.2 W. This is because, in a general switching power source, in the case where the set value of the power transmission controller 211 is equal to the power consumption of a power receiving apparatus, it is possible to perform highly efficient power transmission with less switching loss, otherwise the efficiency is decreased due to increased switching loss.

An example has been described in which the detection precision of the power transmitting apparatus 100 is based on the initial power of the power receiving apparatus. However, another quantity may be used as long as such a quantity is a quantity of a power to be detected by the power transmitting apparatus 100 in the system. For example, the power consumption of a foreign object may be specified as a quantity of a power to be detected.

In the above-described embodiments, as the quantity of electricity that is able to be detected by the power transmitting apparatus 100, the value of the electric current or the value of the power is used and description has been given, however, the quantity of electricity represented by other types of values may be used. For example, the value of the voltage, the value of the impedance, or the value of the voltage of reflective waves may be used.

In the above-described embodiments, an example has been given in which alternate switching between the power transmission mode and the detection mode is performed, however, the modes are not limited to these. For example, a third mode that is a mode for exchanging control signals may be provided and switching among the power transmission mode, the detection mode, and the third mode may be performed cyclically.

The present invention may be implemented by performing the following processing. That is, the processing is such that software (a program) that implements the functions of the above-described embodiments is supplied to a system or an apparatus via a network or various types of recording media and a computer (or a CPU, a micro processing unit (MPU), or the like thereof) in the system or in the apparatus reads and executes the program.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to detect the second power receiving apparatus during transmission of power to the first power receiving apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-133523, filed Jun. 26, 2013 which is hereby incorporated by reference herein in its entirety.

The invention claimed is:

1. A power transmitting apparatus comprising:
   a power transmitting unit configured to transmit power to a plurality of power receiving apparatuses by radio;
   a switching unit configured to switch an operation mode of the power transmitting apparatus, in a case where power is being transmitted to a first power receiving apparatus, between a power transmission mode in which power is transmitted by the power transmitting unit to the first power receiving apparatus in response to a signal from the first power receiving apparatus, and a detection mode in which power transmission is performed by setting an output power of the power transmitting unit to a smaller value than an output power in the power transmission mode so as to detect a second power receiving apparatus that is different from the first power receiving apparatus; and a detection unit configured to detect a quantity of electricity generated by the second power receiving apparatus coming in proximity to the power transmitting apparatus during power transmission performed by the power transmitting unit in accordance with the output power of the power transmitting unit, wherein a quantity of electricity detectable by the detection unit in the detection mode is smaller than a quantity of electricity detectable by the detection unit in the power transmission mode, and the power transmitting apparatus detects the second power receiving apparatus on the basis of the quantity of electricity detected by the detection unit and transmits power to the second power receiving apparatus in response to a signal from the second power receiving apparatus.

2. The power transmitting apparatus according to claim 1, wherein the power transmitting unit performs power transmission in the detection mode such that an output power in the detection mode is smaller than the output power in the power transmission mode.

3. The power transmitting apparatus according to claim 1, wherein the detection unit detects the quantity of electricity generated by the second power receiving apparatus coming in proximity to the power transmitting apparatus during power transmission performed by the power transmitting unit, on the basis of a resolution that is a value obtained by quantizing the output power of the power transmitting unit with predetermined quantization bits, the output power in the power transmission mode has a value such that the detection unit is unable to detect the quantity of electricity generated by the second power receiving apparatus coming in proximity to the power transmitting apparatus, and the power transmitting unit sets the output power in the detection mode to a value such that the detection unit is able to detect the quantity of electricity generated by the second power receiving apparatus coming in proximity to the power transmitting apparatus.

4. The power transmitting apparatus according to claim 3, wherein the resolution in the power transmission mode is different from the resolution in the detection mode.

5. The power transmitting apparatus according to claim 1, wherein the switching unit switches between the power transmission mode and the detection mode alternately.

6. The power transmitting apparatus according to claim 5, wherein the power transmitting apparatus operates in the power transmission mode for a first predetermined time period and operates in the detection mode for a second predetermined time period.

7. The power transmitting apparatus according to claim 1, further comprising:

a communication unit configured to communicate to the second power receiving apparatus a control signal used for wireless power transmission, wherein the switching unit performs control so as to switch from the power transmission mode to the detection mode in accordance with communication performed by the communication unit.

8. The power transmitting apparatus according to claim 1, wherein in a case where the second power receiving apparatus has been detected in the detection mode, the power transmitting unit performs transmission of power to the first power receiving apparatus and to the second power receiving apparatus.

9. The power transmitting apparatus according to claim 1, wherein the quantity of electricity is represented by at least one of an electric current, a power, a voltage, an impedance, and a voltage of reflective waves.

10. A control method for a power transmitting apparatus including a power transmitting unit that transmits power to a plurality of power receiving apparatuses by radio, the method comprising:

switching an operation mode of the power transmitting apparatus, in a case where power is being transmitted to a first power receiving apparatus, between a power transmission mode in which power is transmitted by the power transmitting unit to the first power receiving apparatus in response to a signal from the first power receiving apparatus, and a detection mode in which power transmission is performed by setting an output power of the power transmitting unit to a smaller value than an output power in the power transmission mode so as to detect a second power receiving apparatus that is different from the first power receiving apparatus; and detecting a quantity of electricity generated by the second power receiving apparatus coming in proximity to the power transmitting apparatus during power transmission performed by the power transmitting unit in accordance with the output power of the power transmitting unit, wherein in the detecting, a quantity of electricity detectable in the detection mode is smaller than a quantity of electricity detectable in the power transmission mode, and the power transmitting apparatus detects the second power receiving apparatus on the basis of the quantity of electricity detected in the detecting and transmits power to the second power receiving apparatus in response to a signal from the second power receiving apparatus.

11. A recording medium storing a program for causing a computer to implement a control method for a power transmitting apparatus including a power transmitting unit that transmits power to a plurality of power receiving apparatuses by radio, the method comprising:

switching an operation mode of the power transmitting apparatus, in a case where power is being transmitted to a first power receiving apparatus, between a power transmission mode in which power is transmitted by the power transmitting unit to the first power receiving apparatus in response to a signal from the first power receiving apparatus, and a detection mode in which power transmission is performed by setting an output power of the power transmitting unit to a smaller value than an output power in the power transmission mode so as to detect a second power receiving apparatus that is different from the first power receiving apparatus; and detecting a quantity of electricity generated by the second power receiving apparatus coming in proximity to the power transmitting apparatus during power transmission performed by the power transmitting unit in accordance with the output power of the power transmitting unit, wherein in the detecting, a quantity of electricity detectable in the detection mode is smaller than a quantity of electricity detectable in the power transmission mode, and the power transmitting apparatus detects the second power receiving apparatus on the basis of the quantity of electricity detected in the detecting and transmits power to the second power receiving apparatus in response to a signal from the second power receiving apparatus.

* * * * *